Figure 1:
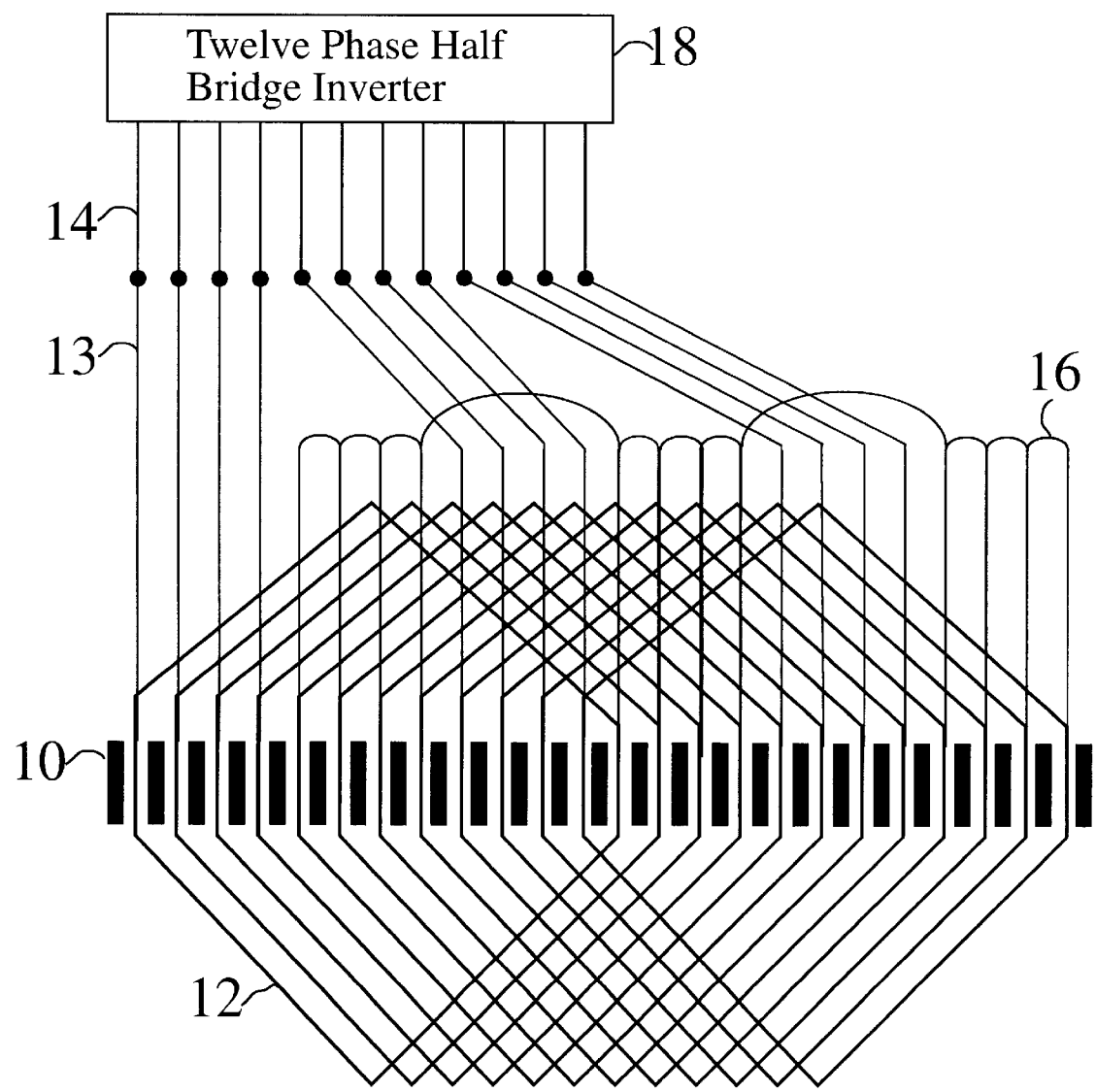

United States Patent [19]
Edelson

[11] Patent Number: 6,054,837
[45] Date of Patent: Apr. 25, 2000

[54] POLYPHASE INDUCTION ELECTRICAL ROTATING MACHINE

[75] Inventor: Jonathan Edelson, Princeton, N.J.

[73] Assignee: Borealis Technical Limited, London, United Kingdom

[21] Appl. No.: 08/715,482

[22] Filed: Sep. 18, 1996

Related U.S. Application Data

[63] Continuation of application No. 08/350,737, Dec. 7, 1994, abandoned, which is a continuation-in-part of application No. 08/267,043, Jun. 28, 1994, abandoned.

[51] Int. Cl.[7] ........................................ H02P 5/34
[52] U.S. Cl. ................................. 318/801; 318/807
[58] Field of Search ............................. 318/790–815, 318/767–771, 772–777, 818–829

[56] References Cited

U.S. PATENT DOCUMENTS

| | | | |
|---|---|---|---|
| 4,161,680 | 7/1979 | Akamatsu | 318/722 |
| 4,218,646 | 8/1980 | Akamatsu | 318/800 |
| 4,484,127 | 11/1984 | Salihi et al. | 318/802 |
| 4,749,933 | 6/1988 | ben-Aaron | 318/810 |
| 4,914,335 | 4/1990 | Horton et al. | 310/71 |
| 4,928,051 | 5/1990 | Demeter et al. | 318/731 |
| 5,194,796 | 3/1993 | Domeki et al. | 318/685 X |
| 5,294,875 | 3/1994 | Reddy | 318/806 X |
| 5,298,848 | 3/1994 | Ueda et al. | 318/811 |
| 5,334,898 | 8/1994 | Skybyk | 310/268 |
| 5,394,321 | 2/1995 | McCleer | 363/131 |

OTHER PUBLICATIONS

H.A. Toliyat, Thomas A. Lipo, J.C. White 'Analysic of a Concentrated Winding Induction Machine' Dec. 1991, IEEE Trans. Energy Conversion pp. 679–692.

E.A. Klingshirn 'High Phase Order Induction Motors' Jan. 1983 IEEE Transactions on Power Apparatus and Systems pp. 47–59.

M. Abbas, R. Christen, T. Johns 'Six–phase Voltage Source Inverter Driven Induction Motor'.

M. Abbas, R. Christen 'Characteristics of a High–Power Density Six–Phase Induction Motor'.

*Primary Examiner*—David S. Martin

[57] ABSTRACT

A polyphase induction machine operated by an inverter drive system. The machine is constructed with concentrated full span windings. Twelve or more phases are used to sufficiently cover the airgap region, in contrast to the conventional three phases using distributed and chorded windings. Substantial efficiency and starting torque benefits are thereby obtained.

18 Claims, 2 Drawing Sheets

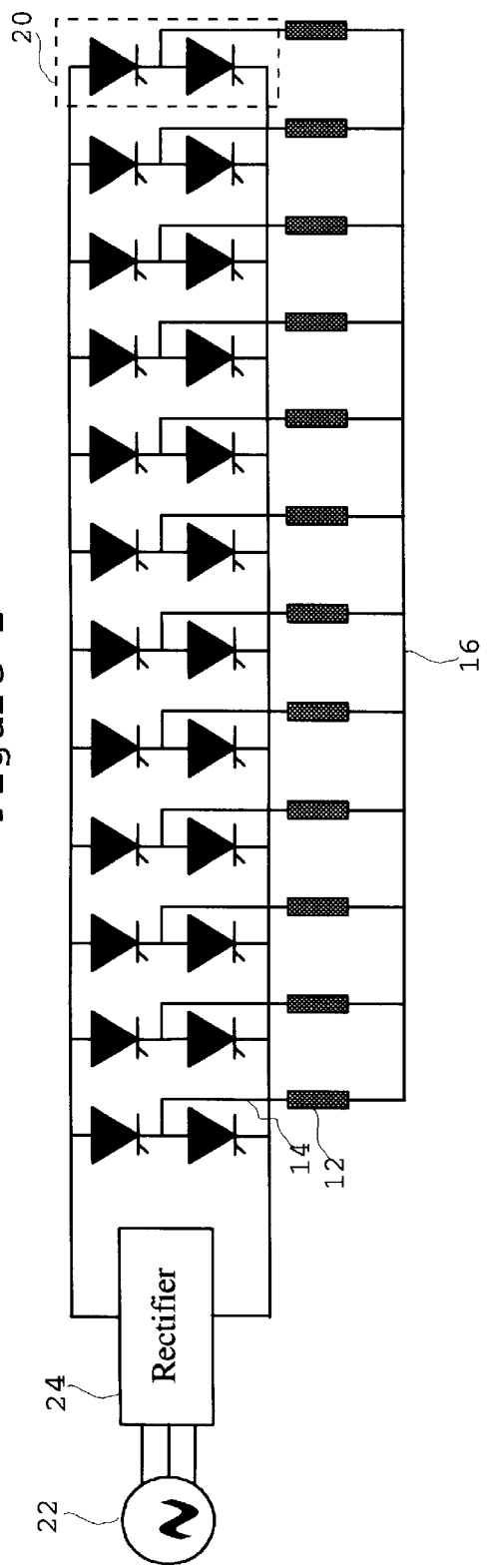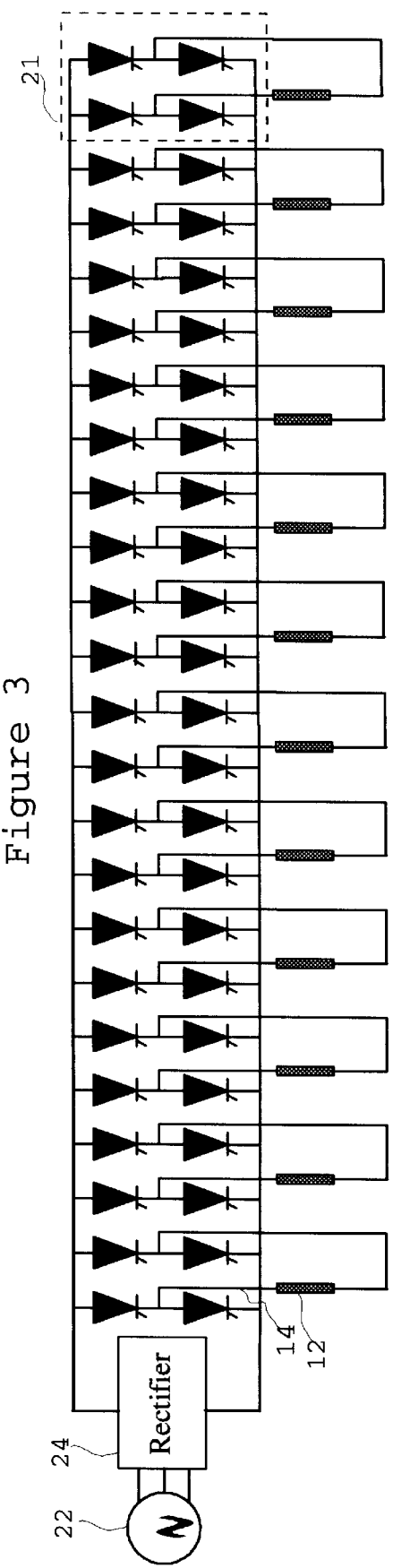

POLYPHASE INDUCTION ELECTRICAL ROTATING MACHINE

CROSS REFERENCE TO RELATED APPLICATIONS

This application is a Continuation-in-Part of the pending application titled "Method of Operating Electrical Rotating Machinery via Independent Synthesis to Each Stator Conductor" U.S. Ser. No. 08/350,737, filed Dec. 7, 1994, which is further a Continuation-in-Part to "Method of Operating an AC Induction Motor via Independent Synthesis of AC Current to Each Stator Winding," U.S. Ser.No. 08/267,043, filed Jun. 28, 1994. This invention is further related to the patent specification filed with the U.S. Patent and Trademark office, under U.S. Ser. No. 08/258,561, entitled "Method for Operating a Polyphase AC Induction Motor", now abandoned.

BACKGROUND

1. Field of Invention

This invention is related to the field of electrical rotating machinery for the conversion between electrical energy and mechanical energy.

2. Prior Art

The basic principal of nearly all electrical rotating machinery is that a current of electrical charge located within a magnetic field will experience a force perpendicular both to the flow of charge and the lines of force of the magnetic field. Most electrical rotating machines make use of this principal by generating a magnetic field directed radially about a cylinder, causing current to flow axially along said cylinder, thus developing a tangential force which causes said cylinder to turn. Other geometries are possible, for example, so called 'axial flux' machines make use of a magnetic field generally parallel to the axis of rotation, and a generally radial current flow, again causing tangential force and thus causing rotation. If a conductor is forced through a magnetic field by some sort of external prime mover, then an electrical current can be caused to flow; this is the principal of the generator.

In the method of the AC induction motor, a rotating magnetic field is produced by the stator or stationary portion of the machine. This rotating magnetic field has two functions. First, it interacts with current carried by conductors of the rotor, causing the rotor to turn. Second, it produces said rotor currents by means of transformer action. Thus the rotor needs no connections to means of electrical supply, and is simply supported by bearings which allow free rotation. Such design simplifies motor construction, and greatly enhances motor reliability. The essence of the AC induction motor, and by extension the AC induction generator, is the production of a smoothly rotating magnetic field in the stator.

The rotating magnetic field is produced by coils of wire or windings, suitably placed in the stator. Each winding, when energized with a direct current, would produce a fixed magnetic field. By energizing a winding with a sinusoidal alternating current, a smoothly varying magnetic field of fixed orientation may be produced. Finally, by placing several windings of differing orientation within the same stator, and energizing said windings with alternating currents of differing phase, a rotating magnetic field may be produced which is the sum of the time varying fixed orientation magnetic fields generated by each winding/phase.

The difficulty with this approach is that production of a smoothly rotating magnetic field depends upon two factors. First, the fixed magnetic field generated by each winding must have a generally sinusoidal distribution of intensity. Second, the alternating currents used to energize the winding must also be sinusoidal in nature. Any deviation from the ideal sinusoidal relations will produce harmonic rotating fields, that is magnetic fields which rotate at a different rate and/or direction from the fundamental field. These rotating fields are superimposed and added to the fundamental rotating magnetic field. Each of these harmonic fields exerts its own pull upon the stator, reducing power output, and each results in its own electrical losses, again making the motor less efficient.

Harmonic fields generated by the non-sinusoidal nature of the field generated by each winding are termed spatial harmonics or air-gap harmonics. Harmonic fields generated by non-sinusoidal drive wave-forms are termed temporal harmonics.

Methods for the analysis of harmonic rotating fields in three phase induction machines are well known, and may be found in many textbooks on rotating machinery.

Spatial harmonics are mitigated in three phase machines through the use of distributed windings and chorded windings. These are winding techniques which result in a decrease in the fundamental efficiency of the machine, increasing resistance losses in the windings by up to fifteen percent or more. However these winding techniques disproportionately reduce the strength of harmonic fields. The net result is that both machine operation and total efficiency is improved.

Temporal harmonics are only considered a problem with the advent of inverter based variable frequency motor control systems. These systems produce wave-forms rich in harmonic content. Mitigation of these harmonics has been limited to improving the characteristics of the inverter systems, reducing the harmonic content of the output wave-forms through pulse shaping and higher switching frequencies.

Temporal harmonics also become a problem when high magnetic saturation levels are used. Ferromagnetic materials are used in motor construction because of the much higher magnetic fields which are developed for a given current flow. However, as the magnetic field strength is increased, the relationship between current flow and generated magnetic field becomes non-linear. Even if a perfectly sinusoidal alternating current is applied to a winding, temporal harmonics in the resulting magnetic field will be generated. The intensity of these harmonics increases with increasing saturation, thus setting a limit on the saturation levels which may be used. Winding techniques cannot effectively reduce the strength of harmonic fields generated by high saturation in three phase machines.

The closest known prior art is ben-Aaron, "Polyphase Induction Motor System and Operating Method", U.S. Pat. No. 4,749,933, Date of Patent Jun.7, 1988. Ben-Aaron devised a method of pole changing wherein the number of magnetic poles of the stator magnetic field might be dynamically varied. Ben-Aaron made use of a plurality of pulse width modulated sine wave inverters to provide alternating current to individual stator inductors. Each inductor extendes the length of a stator slot, at which point it is connected to a conductive ring representing the star point of the polyphase circuit. There are two major deficiencies to the approach disclosed in ben-Aaron(1988). The first is that his induction motor is a low voltage, high current device, requiring expensive switching devices which are underutilized owing to the low voltage used. The second flaw is that pole changing does not enhance the torque capabilities of flux density limited machines. The present inventor has determined experimentally that lower pole counts are beneficial to efficiency at high speeds and beneficial to torque at low speeds.

Mention of polyphase induction machines is also common in the art, with the general understanding that polyphase means three, or possibly two, phases. The EASA formulae for winding calculations, for example, do not restrict the number of phases in any way. However, textbook analysis of harmonic interactions are performed only on the three phase machine. Electronic drive systems almost invariably are three phase systems, or perhaps rarely single phase systems. Induction machine drive systems of any desired phase count are totally consistent with basic motor physics and design theory, however current motor design practice does not make use of high phase order systems, and there are heretofore unrecognised benefits of high phase order systems.

BRIEF DESCRIPTION OF THE INVENTION

In the method of the present invention, an AC induction machine is operated by an inverter drive system. The improvement over the prior art is that the number of independently driven phases is increased to more than the conventional three, preferably to a number substantially greater than three, such as twelve phases or more. The stator is wound with little or no chording, and with little or no winding distribution, both allowing windings with fewer turns to be used. Thus resistance losses owing in the stator windings are reduced. Large machines with low pole counts are facilitated by the reduced winding distribution, again enhancing efficiency because low pole count machines are more efficient. Great control of stator magnetic field structure is possible, to the point that motor pole configuration may be changed purely electronically, in a manner similar to, but substantially improved over, ben-Aaron (1988).

The most important result of the method of the present invention is that the use of many phases reduces substantially the problems associated with harmonic rotating fields. Specifically, in a fashion novel to the art, the use of many phases causes harmonic fields up to a number equal to the number of phases to rotate in synchronism with the fundamental rotating field. Both spatial harmonic rotating fields and temporal harmonic rotating fields are still developed, but such rotating fields add beneficially to the fundamental rotating field of the machine. Harmonics of higher order than the number of phases still excite non-synchronous rotating fields; however such high order harmonics are in general very weak. Thus motor efficiency losses associated with harmonic rotating fields are reduced.

The method of the present invention allows for the use of drive wave-form with high harmonic content, and in an embodiment of the present invention, square wave inverters are used in place of the more complex and expensive sine wave inverters to drive the induction rotating machine. The method of the present invention allows for the use of high saturation levels, and in an embodiment of the present invention high voltage is used to produce high flux densities, thus increasing the overload output capabilities of the induction rotating machine.

Objects and Advantages

Accordingly, besides the objects and advantages of the methods of operating an AC induction machine. described in above, several objects and advantages of the present invention are the following:

It is an object of the present invention to provide a method by which rotating machinery of few poles can be constructed which demonstrate good chord factor and winding distribution factors.

An advantage of the present invention is that rotating machinery with low pole counts, and thus greater efficiency and capability, can be used where high pole count machines are currently being used.

It is an object of the present invention to provide a method by which current inverter technology can be used in a new and beneficial fashion through the use of more than three inverter phases.

An advantage of the present invention is that all of the technology developed for three phase inverters may be applied to a more efficient method of operating electric motors. The technological advances include pulse width modulation inverters, current mode, voltage mode, switching rate dither, etc. Any present or future developments in inverter design will be immediately applicable to the method of the present invention.

An advantage of the present invention is that the use of multiple inverters will enhance system fault tolerance. Should an inverter leg fail, only a single motor winding will cease to function, and most of the motor capacity will remain available.

An advantage of the present invention is that currently available inverter technology may be used to enhance the efficiency and performance of electrical rotating machinery.

It is an object of the present invention to enhance the stall torque and reduce the stall power consumption of electric motors.

An advantage of the present invention is that a given size electric motor will be more capable of starting inertial loads. When operated as a generator for regenerative braking purposes, a given size induction machine will be more capable of stopping inertial loads.

An advantage of the present invention is that inertial loads will be more quickly brought up to running speed.

An advantage of the present invention is that less energy will be dissipated when starting and stopping electrical rotating machinery.

An advantage of the present invention is that a smaller motor may be used on large inertial loads, allowing the motor to operate much nearer to full power after said inertial load is accelerated to operational speed. This will enhance the efficiency of such systems as motors are more efficient when operated nearer to full power.

It is an object of the present invention to reduce the zero load power consumption of electric motors.

An advantage of the present invention is that motor operation will be more efficient, especially so at low duty factors.

An advantage of the present invention is that stator heating will be significantly reduced.

It is an object of the present invention to provide greater reliability through redundancy in drive electronics.

An advantage of the present invention is that the motor and drive system will continue to function although a single inverter may fail.

An advantage of the present invention is that the smaller inverter modules may be constructed as inexpensive replaceable units, facilitating repair.

It is an object of the present invention to provide a method of operating electrical rotating machinery in which the winding distribution and winding chord factors are minimized.

An advantage of the present invention is that the winding copper is more effectively used.

An advantage of the present invention is that rotating machine efficiency is enhanced.

Further objects and advantages of this invention will become apparent from a consideration of the figures and the ensuing descriptions.

DRAWING FIGURES

Figure one is a schematic representation of the winding of a twelve phase induction machine of the present invention. The stator windings are 'developed' in the conventional fashion.

Figure two is a schematic representation of a twelve phase DC link inverter drive system using half bridge drive for each phase.

Figure three is a schematic representation of a twelve phase DC link inverter drive system using full bridge drive for each phase.

Reference Numerals in Drawings

10 Developed Schematic of Stator Teeth and Slots
   12 Full Span Concentrated Windings
   13 Coil End Leads
   14 Leads to Inverters
   16 Star Point
   18 Twelve Phase Half Bridge Inverter
   20 Half Bridge
   21 Full Bridge
   22 AC Power Source
   24 Rectifier Description of Figure A typical embodiment of the present invention is presented in FIG. 1. The present invention is embodied on standard induction motor frames, and as such the figure presents a winding diagram which would be applicable to such a frame. A stator 10 is represented schematically, using thick bars to represent the stator teeth and the spaces between said bars to represent slots. Coil end leads 13 are represented by thin lines, which continue as leads 14 to an inverter 18 or which terminate at a star point 16.

FIG. 1 is a schematic representation of an embodiment of the present invention characterized by the following:

24 slot stator 10
   1 to 13 span windings 12.
   coil ends 13 1,2,3,4,9,10,11,12,17,18,19,20 connected to twelve phase inverter 18 by means of leads 14.
   coil ends 5,6,7,8,13,14,15,16,21,22,23,24 connected to a star point 16.

FIG. 2 ia a more detailed schematic of the twelve phase inverter 18, showing an AC power supply 22 supplying a rectifier 24 which supplies DC power to half bridges 20. Half bridges 20 alternately switch their output leg between the positive and negative DC supply, synthesizing suitable alternating current output. Alternating current output is fed via the leads 14 to the windings 12. As this is a schematic diagram, the representations of the windings 12 and the leads 14 are very different between FIGS. 1 and 2, however it will be clear to an individual skilled in the art that these representations describe the same structures.

FIG. 3 is a detailed schematic of a twelve phase full bridge inverter. In this schematic, two half bridge elements act together as a single full bridge element 21, supplying AC power to both ends of the windings 12. The use of a full bridge inverter doubles the power handling capacity of the device, and removes consideration of star point balance, however it substantially increases inverter complexity. Operation is conceptually similar to that of the half bridge inverter, and is will known in the art.

DESCRIPTION OF INVENTION

The present invention consists of an AC induction machine connected to an inverter drive system capable of providing necessary power to said induction machine. As such, much of the construction parallels that of conventional three phase motor system construction. As description, I present design information which will permit an individual skilled in the design of three phase drive systems to build a many phase system. I do not attempt to define the many aspects which are well known in the field. The difference between the present invention and well known three phase systems lies in the number of phases used, and the ensuing description will focus upon this difference.

The method of the present invention is applicable to all geometries of the AC induction machine. It is further applicable to both squirrel cage and wound rotor machines. To enhance disclosure, the ensuing description will initially limit itself to the conventional radial flux rotor contained within stator squirrel cage design. It will be obvious to those skilled in the art how to apply the method of the present invention to other machine geometries.

The method of the present invention is also applicable to all different inverter topologies used for the operation of three phase machines. These include voltage mode pulse width modulation inverters, which provide an alternating current regulated to a specified rms voltage, current mode pulse width modulation inverters, which provide an alternating current regulated to a specified rms current. Also included are linear inverters which provide true continuous output, both current mode and voltage mode. Also included are DC link inverters, resonant link inverters, and cycloconverters, all of which are different modes of supplying power to the inverter legs. Power factor correction hardware may be used on the input legs of the inverter drive system, and regeneration capability may also be a functional part of the inverter drive system. Square wave inverters with extremely high harmonic content in the output wave form may be used. Push pull inverters may be used, doubling the effective voltage capability of the inverter drive system, at the expense of using more active devices. The range of inverter topologies available will be apparent to an individual skilled in the field of three phase inverter drive systems.

Stator Winding Design:

The methods used to figure a many phase winding are completely analogous to methods used for three phase windings. The points of difference are as follows:

a) Pole/phase groups generally involve only a single slot.
   b) Winding distribution factors are nearly unity, windings being distributed across the width of a single slot.
   c) Full span windings are generally used, increasing motor end copper.
   d) A winding generally consists of a single coil in a single slot pair. The full phase voltage is therefor applied to a single coil, necessitating high turn counts. This is offset by the fact that each phase only carries a fraction of the entire supply current.
   e) Phase angle for a given phase depends only upon the electrical angle of the phase winding associated with said phase.

The relationship between flux per pole is given by the following formula, taken from three phase design practise:

$$\text{Flux/pole} = \frac{22{,}500{,}000 \times \text{coil voltage}}{\text{frequency} \times \text{turns/coil} \times K_d \times K_s}$$

Where flux per pole is given in lines of force, coil voltage is in Volts, frequency is in Hertz, $K_d$ is the winding distribution factor, and $K_s$ is the winding chord factor. These variables have precisely the same meaning herein that they have in three phase motor design. For a two pole machine with a single coil per phase, phase voltage and coil voltage will be the same. For higher pole counts, windings of corresponding phase may be interconnected in either series or parallel configuration, as in conventional three phase machines, thus phase voltage may be different from coil voltage.

As in conventional three phase motor design, a maximum flux per pole is selected based upon stator size, air gap size, and saturation considerations. Phase voltage is selected based upon inverter design considerations.

In the method of the present invention, a single phase winding will generally occupy a single slot per pole, thus winding distribution factor will generally be 1 or nearly 1. Likewise, full span windings will generally be used, leading the winding chording factor to also be 1 or nearly 1. This is in marked contrast to conventional three phase machine design, wherein distributed windings must be used, and chorded windings are generally used. The use of distributed windings is possible in the method of the present invention, possibly as a design trade-off wherein fewer inverter legs are used at the expense of poorer harmonic utilization.

Thus, in general, a many phase winding will be wound by conventional means, but will have the full phase voltage, or a large fraction thereof, applied to each coil. Full pitch windings will in general be used, and in general adjacent coils will not be connected together to form phase bands.

A major difference between conventional three phase design practice and many phase design practice is selection of appropriate phase angle for each phase. In conventional three phase design, the phase angle between adjacent phases is 120°, with phase belts being placed 120 electrical degrees apart in the stator winding. In the method of the present invention, the phase angle of the alternating current supplied by a given inverter leg is arbitrary, and defined by the inverter control system. The phase angle between the alternating current supplied to any two phases is simply made to be equal to the electrical angle between the coils driven by said phases. This electrical angle need not subdivide the stator evenly.

For example, a twelve phase, two pole machine may be constructed in a twenty-four slot stator by winding twelve coils of 1 to 13 pitch. Each coil is fifteen electrical degrees apart, thus the phase angle of the current supplied by each phase of the inverter system is fifteen degrees apart. Such a configuration would work well if push pull inverters where used which were connected to both sides of each phase coil. It will be noted that the phase angle between phase twelve and phase one is 195°. This is acceptable owing to the fact that electrical locations 180° to 345° are the 'back sides' of the driven coils. Were it desired to use half bridge inverters with star connected windings, then the above imbalanced connection would not be acceptable. A balanced drive configuration may be achieved by driving the coil ends at slots 1,2,3,4,9,10,11,12,17,18,19,20 and star connecting the other coil ends. In this case the phase angles between phase 1 driving the coil end at slot one would be 0°,15°,30°,45°, 120°,135°,150°,165°,240°,255°,270°,295°. Despite the uneven phase angles, the motor will be driven smoothly.

To reiterate, the phase angle of the alternating current used to supply each phase need simply be matched to the electrical angle of each phase winding within the motor. Symmetry in terms of the vector sum of all phase angles used is necessitated only by a star connection to the inverter drive system. Phases need not be evenly spaced throughout the stator.

Inverter Specification:

The variable voltage, variable frequency inverter system is an industry standard, with well known benefits. With such systems, a motor may be driven between zero speed and maximum rated rpm. The motor may be dynamically braked, or operated in a regenerative mode wherein the motor is slowed down by converting kinetic energy back into electrical energy and supplying such back to the supply of electrical energy.

The use of feedback systems, well known in the art for three phase machines, is equally applicable to the present invention. In such systems, controller frequency and voltage are adjusted in response to the desired operation of the rotating machine and to the measured actual operation. For example, if the measured speed were below the programmed speed, a feedback control system would command higher frequency AC drive. The capability of such feedback systems will be enhanced by the greater torque capability of many phase motors.

Production of a many phase inverter system will be obvious to an individual skilled in the art of three phase systems. Specifically, the modification necessary is the addition of additional phase legs, and alteration of the drive logic to supply output wave-forms of suitable shape and phasing. There are particular factors which must be noted in relation to many phase systems.

a) Stator windings, and thus electrical phase angles, are not necessarily evenly distributed.

b) Push/pull inverter legs may be used to drive both sides of each phase.

c) The need for high switching frequencies, used in three phase machines to reduce harmonic content of the drive wave-form, is reduced. Because of the high tolerance for harmonics in the drive wave-form, square wave inverters may be used, giving benefit in terms of inverter cost.

d) Many inverters are effectively operating in parallel, allowing the use of smaller devices and giving greater fault tolerance.

Specific mention of microcontroller systems should be made. Such systems are currently used in three phase drive application, wherein the microcontroller, under software control, develops pulse width modulated control signals for each of the three inverter legs. Through the simple expedient of adding additional output subroutines and using additional output lines, such a microcontroller may be used to control additional inverter legs, thus forming an inverter system of higher phase count.

Machine Geometry Selection:

The industry standard induction machine is the squirrel cage induction motor. In this motor, the region of interaction between the stator and the rotor may be considered the surface of a cylinder. Rotation is about the axis of said cylinder, lines of magnetic flux pass through said cylinder normal to said cylinder, and current flow in both the stator conductors and the rotor conductors is parallel to the axis of said cylinder.

The method of the present invention is applicable to any geometry in which the region of interaction between stator and rotor has circular symmetry about the axis of rotation, magnetic flux is generally normal to said region of interaction, and current flow is generally perpendicular both to flux and the direction of motion.

Alternative geometries which may be utilized in the method of the present invention are axial flux 'pancake' motors, radial flux geometries in which the rotor is external to the stator, or geometries which use a combination of axial and radial flux, or multiple axial flux paths. Of particular interest is the latter geometry, wherein a dual sided pancake stator is surrounded on both faces by a pancake rotor.

The region of interaction, or airgap, in the above geometry consists mainly of the two disks on the faces of the stator. Magnetic flux flows in a perpendicular fashion through the air gap, generally parallel to the axis of rotation. Machine slots and conductors are arranged in a radial fashion, thus current flow is radial, magnetic flux axial, and force tangential. Thus rotation is produced. The particular attraction of this geometry is that rotor end copper usage is reduced to a minimum, particularly advantageous in large rotating machinery of low pole count.

Operation at High Flux Levels:

In conventional three phase motor design, flux densities in the stator iron are generally limited to 120,000 lines per square inch, a value which will change depending upon the magnetic steel used. From consideration of stator iron cross sectional area, tooth area, and air-gap area, as well as the maximum desired flux density, the design flux per pole may be selected, and winding calculations performed as above.

Output torque capability of a machine scales as the square of the flux density. There is, therefore, good reason to increase the design flux density. In a conventional three phase machine, increased flux density would mean excessive harmonic losses, however this is not the case with a many phase machine. In the many phase machine, harmonic rotating fields generated by saturation rotate in synchronism with the fundamental rotating field. It is therefore practicable to design for machines with flux densities of 150,000 lines per square inch or more. More reasonable, in terms of minimizing reactive power consumption, is to design at conventional flux densities, and design for over voltage operation for short period overloads. It is expected that the maximum torque capabilities may be increased by 200% or more through the use of high flux densities.

Pole Changing Capability:

As noted in the section on winding design, the phase angle at which a given phase is driven must be equal to the electrical angle of the coils which belong to that phase. However, the measure electrical angle is relative to the pole configuration developed. If one changes the phase angle at which a given phase is driven, the pole configuration will be forced to change such that phase angle and electrical angle will match.

For example, a twelve phase two pole motor is constructed. Normal operation would use a phase angle of fifteen degrees between adjacent phases. However, if a phase angle of forty-five degrees were used, then the machine would operate as a six pole machine. The maximum pole count which may be used is equal to the number of stator slots. In general, the use of higher pole counts than the minimum is of little benefit to machine operation. However the pole changing capability is noted as an interesting and perhaps useful aspect of multiphase designs.

DESCRIPTION OF PROTOTYPE

A prototype of the invention was built and operated for testing. The elements contained within the prototype should not be considered to be the best mode of the invention for commercial purposes, as the prototype was assembled with the sole purpose of expeditiously proving the advantages of the invention. In order to provide a full disclosure, and to insure that an individual of even minimal skill in the art could reproduce my results, the prototype merits its own description and description of operation. Many specificities are mentioned here; they should not be considered as limiting the scope of this patent in any way.

The elements of the prototype are as follows.

The motor was custom wound on a standard frame from which the production winding was removed. The frame used was from a two pole, totally enclosed, fan cooled, size 184T machine. This machine was originally rated at 5 horsepower (4 kW) at 3500 RPM. Internally, the machine had a twenty-four slot stator and a squirrel cage rotor with cast aluminum conductors. The machine was rewound with a twelve phase, two pole stator winding with all coil ends brought out to external termination. Coil span was 1 to 13, giving a full span winding, and 50 turns per coil was used.

The inverter system was based upon the International Rectifiers "Design Tips" booklet numbered DT 93-6, based upon the IR2130 interface chips. The inverters were hand wire wrapped units, using IRGPC30FD2 IGBT transistors as the power devices. No provision was made for the DC supply, and a standard laboratory supply was used as the primary DC power source for testing. Four three phase inverters were used to supply twelve independent phases to the motor. (A later version used a single IR2130 per phase to allow for greater experimental isolation.)

Logic control for the inverter systems was provided by a general purpose IBM compatible computer. Twenty four bits of parallel output were used to supply the on/off coding to the IR2130 controller chips. Software running on the computer provided pulse width modulated signals of appropriate phasing to operate the motor. Phase angle was adjustable so as to demonstrate pole changing. Additionally, output waveform was adjustable, and square wave operation was demonstrated using the prototype apparatus.

I claim:

1. An electrical rotating machine comprising an induction machine, supplied with polyphase alternating current by variable voltage, variable frequency drive, the improvement wherein being the use of a plurality of phases numbering twelve or greater in both said induction machine and said drive, a stator of said induction machine being characterized by star connected, full span, concentrated windings, said stator of said induction machine having a ratio of phases to poles of greater than or equal to twelve phases per each two stator poles.

2. An electrical rotating machine as in claim 1, wherein said stator of said induction machine in further characterized as being a two pole stator.

3. An electrical rotating machine as in claim 1, wherein said stator of said induction machine is further characterized by having irregularly positioned windings, wherein said variable voltage, variable frequency drive is configured to produce an asymmetrical alternating current output suitable to supply said irregularly positioned windings of said stator of said induction machine.

4. An electrical rotating machine as in claim 1, wherein said variable voltage, variable frequency drive system is capable of variation of phase angle of said alternating current.

5. An electrical rotating machine as in claim 1, wherein said inverter drive system causes induction machine operation at high saturation levels.

6. An electrical rotating machine as in claim 5, wherein said high saturation levels are of flux density greater than 150,000 lines per square inch.

7. An electrical rotating machine as in claim 1, wherein said plurality of phases numbering twelve or greater is further limited to even number of phases.

8. A method for employing rotating harmonic fields to increase torque and efficiency of a two pole electrical rotating machine comprising:
   a. wiring said electrical rotating machine with full span concentrated windings, said windings being positioned at relative electrical angles, the number of said windings being twelve or greater, the position of said windings possibly irregular, and
   b. supplying each of said windings with an individual phase of polyphase alternating current, said polyphase alternating current having a phase count of twelve or greater, and containing both fundamental and harmonic current, and
   c. controlling each of said phase of said polyphase alternating current such that the relative phase angle of each of said phases corresponds to said relative electrical angles of each of said windings.

9. An electrical rotating machine consisting of an induction machine operated by variable voltage, variable frequeney drive, the improvement wherein being the use of a plurality of phases numbering twelve or greater in both said induction machine and said drive, said induction machine being further characterized by full span concentrated windings, said drive system being further characterized by push/pull inverter legs driving both sides of each phase, said induction machine being further characterized by having each of said phases electrically independent.

10. An electrical rotating machine as in claim 9, wherein said stator of induction machine is a two pole stator.

11. An electrical rotating machine consisting of an induction machine, supplied with polyphase alternating current by variable voltage, variable frequency drive, the improvement wherein being the use or a plurality of phases numbering twelve or greater in both a stator of said induction machine and said drive, said stator of said induction machine being further characterized by star connected, full span, concentrated windings.

12. An electrical rotating machine an in claim 11, wherein said stator of said induction machine is further characterized as a two pole stator.

13. An electrical rotating machine as in claim 11, wherein said stator of said induction machine is further characterized by a ratio of phases to poles of greater than or equal to twelve phases per two poles.

14. An electrical rotating machine as in claim 11, wherein said plurality of phases numbering twelve or greater is an even number of phases.

15. An electrical rotating machine as in claim 11, wherein said stator of said induction machine is further characterized by having irregularly positioned windings, wherein said variable voltage, variable frequency drive in configured to produce an asymmetrical alternating current output suitable to supply said irregularly positioned windings of said stator of said induction machine.

16. An electrical rotating machine as in claim 11, wherein said variable voltage, variable frequency drive system is capable of variation of phase angle of said alternating current.

17. An electrical rotating machine as in claim 11, wherein said inverter drive system causes induction machine operation at high saturation levels.

18. An electrical rotating machine as in claim 17, wherein said saturation levels are of flux density greater than 150,000 lines per square inch.

* * * * *